US006841233B2

(12) United States Patent
Kinoshita et al.

(10) Patent No.: US 6,841,233 B2
(45) Date of Patent: Jan. 11, 2005

(54) SOURCE SHEET FOR STENCIL PRINTING, PLATE MANUFACTURING METHOD, AND STENCIL PRINTING METHOD

(75) Inventors: Hideyuki Kinoshita, Ibaraki-ken (JP); Yasuo Yamamoto, Ibaraki-ken (JP); Tsutomu Nio, Ibaraki-ken (JP); Toru Nakai, Ibaraki-ken (JP); Yuichi Ogawa, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 10/244,745

(22) Filed: Sep. 17, 2002

(65) Prior Publication Data

US 2003/0110962 A1 Jun. 19, 2003

(30) Foreign Application Priority Data

Sep. 18, 2001 (JP) .................................... P2001-283600
Sep. 10, 2002 (JP) .................................... P2002-263836

(51) Int. Cl.[7] .............................. B32B 3/26; B41N 1/24
(52) U.S. Cl. ............................... 428/316.6; 428/315.7; 428/304.4; 428/195.1; 101/128.21; 101/114
(58) Field of Search .......................... 428/315.7, 316.6, 428/195.1, 304.4; 101/114, 128.21

(56) References Cited

U.S. PATENT DOCUMENTS 3,610,141 A * 10/1971 Ramsey ...................... 101/124
5,830,603 A * 11/1998 Oka et al. .................. 429/249
6,550,380 B2 * 4/2003 Kinoshita et al. ........ 101/128.4
6,595,129 B2 * 7/2003 Mori ..................... 101/128.21
2002/0054987 A1 5/2002 Yamamoto et al.

FOREIGN PATENT DOCUMENTS

GB 2327129 1/1999
JP 05104874 4/1993

* cited by examiner

*Primary Examiner*—Terrel Morris
*Assistant Examiner*—Hai Vo
(74) *Attorney, Agent, or Firm*—Nath & Associates PLLC; Gary M. Nath; Derek Richmond

(57) ABSTRACT

The invention relates a source sheet for stencil printing comprising: a porous support material; a porous resin film formed on a surface of the porous support material;

wherein, the porous support material has a maximum air permeability of 90 s/100 cc; and, the porous resin film has a maximum air permeability of 600 s/100 cc;

preferably, the air permeability of the porous support material≦the air permeability of the porous resin film.

According to the source sheet and plate manufacturing method of the present invention, the plate for the stencil printing can be obtained which is superior in the pore block property and in which the thermal deformation of the source sheet during the plate manufacturing is suppressed.

7 Claims, 1 Drawing Sheet

SOURCE SHEET FOR STENCIL PRINTING, PLATE MANUFACTURING METHOD, AND STENCIL PRINTING METHOD

BACKGROUND OF THE INVENTION

1. Field of the Invention

The present invention relates to a source sheet for stencil painting, a method of manufacturing a plate for stencil printing from the source sheet, and a stencil printing method in which the plate is used.

2. Description of the Related Art

As a source sheet for stencil painting (stencil source sheet), a heat-sensitive source sheet for the stencil printing perforated by infrared irradiation or a thermal head has heretofore been known. The source sheet obtained by attaching a thermoplastic film and porous tissue paper to each other by an adhesive has been for general use.

Moreover, as a stencil printing apparatus in which the heat-sensitive source sheet is used, mainly a rotary stencil printing apparatus and simple press type stencil printing apparatus are known.

In these printing apparatuses, ink is pushed out from a tissue paper side of the source sheet through pores made in the film corresponding to image area, and transferred onto a printing sheet so that the printing is performed.

In a conventional stencil printing system, much time is required for ink to permeate through the printing sheet, and therefore there has been a demand for improvement in an ink drying property.

That is, the ink does not easily permeate through the printing sheet. This causes a problem that fingers are stained upon touching a printed matter immediately after the printing. As another problem, when the printing of second and subsequent-color in a multicolor printing or the printing of a back surface in a double-surface printing is continuously performed, the ink on an insufficiently dried printing sheet is transferred to a rubber roll of a printer, the ink is again transferred to the next printing sheet, and the printed sheet is made dirty. This further causes a problem that a long time (e.g., about 10 to 20 minutes) is taken for shifting to the next step in order to sufficiently dry the sheet.

Here, in order to enhance the drying property of the ink, it is effective to use a low-viscosity ink and enhance permeability of the ink into the printing sheet.

However, when the low-viscosity ink is used, but when an ink transfer amount is excessive, the drying property is deteriorated. Therefore, when the low-viscosity ink is used in the conventional stencil printing system, it is necessary to set a perforation diameter to at least 20 $\mu$m or less in order to control the ink transfer amount.

However, when the perforation diameter is reduced as described above, a perforated dot density needs to be raised in order to prevent the image area from thin spots. For this, it is necessary to raise a heating element density (resolution) of the thermal head. This requires not only cost increase of the thermal head, but also remarkable level enhancement of peripheral techniques such as the securing of durability of the thermal head, enhancement of yield, and increase of film sensitivity of the heat-sensitive source sheet.

To solve the above-described problems, the present inventors have proposed a stencil source sheet and printing method in which a micro porous plastic sheet (hereinafter referred to as the micro porous sheet) with micro continuous pores formed beforehand therein by a submicron unit is used to block off pores corresponding to non-image area and thereby a portion prohibiting passage of ink is formed (Japanese Patent Application No. 2000-188504).

However, a manufacturing process of the above-described micro porous sheet is complicated, and much time is required for forming the micro pores in the sheet. Therefore, there are problems that a film forming rate is very slow, productivity is deteriorated, and the process is economically insufficient.

Furthermore, since the manufacturing process of the micro porous sheet includes an extension process in forming the films, the sheet has a property of easily thermally contracting by heating. Therefore, the micro porous sheet is thermally deformed more than necessary by the heating by the thermal head in manufacturing a plate. There is a problem that a dimension reproducibility in manufacturing the plate is deteriorated.

As described above, in the stencil printing, it has been difficult to satisfy both image properties such as the preventing of the image area from thin spots, and quick-drying properties.

SUMMARY OF THE INVENTION

The present invention has been developed in consideration of the above-described problems and an object thereof is to provide a source sheet for stencil painting which has the following characteristics. That is, when an ink having a high permeability into a printing sheet and a low viscosity is used in order to enhance an ink quick-drying property in the stencil printing, an ink transfer amount is suppressed to an appropriate amount, a manufacturing process is simple and economically efficient, and thermal deformation in manufacturing a plate is suppressed so as to achieve a superior dimension reproducibility. Another object of the present invention is to provide a plate manufacturing method for the stencil printing, in which the source sheet is used, and a stencil printing method in which the plate made in the plate manufacturing method is used and which is superior in image properties.

As a result of intensive researches for solving the above-described problems, the present inventors have found that an inventive source sheet for stencil painting in a simple manufacturing method, method of manufacturing a plate, and stencil printing method can be obtained. Concretely, as the source sheet for stencil printing, a porous support material with a porous resin film formed on a surface thereof is used, and air permeability degrees of the porous support material and porous resin film are further defined. Thereby, when ink having a low viscosity in a range of 0.001 to 1 Pa·s is used, a transfer amount of ink can be controlled to have an appropriate amount, thermal deformation in manufacturing a plate is suppressed, and a plate manufacturing defect can be suppressed. Then, the present inventors have completed the present invention.

That is, according to the present invention, there is provided a source sheet for stencil printing comprising: a porous support material; a porous resin film formed on a surface of the porous support material;

wherein, the porous support material has a maximum air permeability of 90 s/100 cc; and, the porous resin film has a maximum air permeability of 600 s/100 cc.

Particularly, it is preferable that the air permeability satisfies the following relation:

the air permeability of the porous support material≦the air permeability of the porous resin film.

Furthermore, it is preferable that the porous resin film is formed substantially of a thermoplastic resin, a release layer is formed on the surface of the porous resin film, an average pore diameter of the porous resin film is is a maximum 20 μm, and the porous resin film contains an antistatic agent.

Moreover, according to the present invention, there is provided a method of manufacturing a plate of a source sheet for stencil printing, comprising: blocking off pores of the porous resin film of the source sheet for the stencil printing so as to form a portion prohibiting passage of ink, wherein the method preferably further comprises: blocking off the pores by heat fusion.

When the source sheet for stencil printing according to the present invention is used, a passing amount of the ink having a high permeation rate into a printing sheet and low viscosity is appropriately controlled. That is, according to the present invention, there is provided a stencil printing method comprising: using the ink having a viscosity in a range of 0.001 to 1 Pa·s to perform the printing from a plate (plate manufactured of the source sheet for stencil printing) for stencil printing obtained by blocking off pores of the porous resin film of the source sheet for the stencil printing so as to form a portion prohibiting passage of ink.

Thereby, as compared with the conventional ink (viscosity of 2 to 10 Pa·s), an ink drying property can remarkably be enhanced in a printed matter. Moreover, since the transfer amount of the ink is controlled, blur of the printed matter by the ink is not generated.

Furthermore, the source sheet for stencil printing according to the present invention is very easily manufactured, when the porous resin film is only formed on one surface of the porous support material. This method is not complicated, and film forming rate is not slow, different from the manufacturing method of the micro porous sheet. Moreover, different from the conventional source sheet for the stencil printing, a step of attaching the porous support material and plastic film to each other is not necessary. Thereby, web cut or wrinkle is not generated, productivity is remarkably satisfactory, and the source sheet is economically very efficient.

DESCRIPTION OF THE PREFERRED EMBODIMENT

Figure 1:
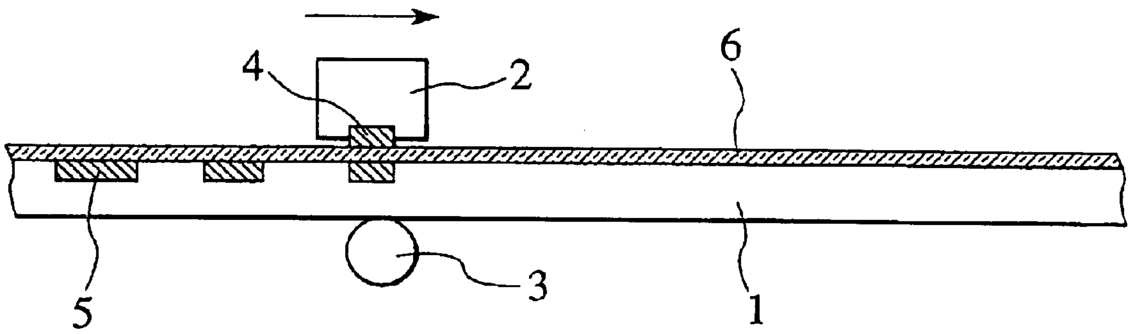
FIG. 1 is a schematic longitudinal sectional view showing one example of a plate manufacturing method of the present invention, in which a source sheet for stencil printing according to the present invention is formed into a plate by heat fusion by a thermal head.

Embodiments of the present invention will be described hereinafter with reference to the drawing.

A source sheet for stencil painting according to the present invention has a constitution in which a porous resin film is formed on a surface of a porous support material.

The porous support material as a base material of the porous resin film preferably has a superior thermal dimensional resistance in order to substantially preventing the source sheet for stencil printing from being thermally deformed during manufacturing of a plate.

Examples of the porous support material for use in the present invention include: papers such as a tissue paper containing a major component of cellulose, and a coated paper; machined papers mixed with synthetic fibers such as a polyester fiber; and fabrics such as a woven cloth and non-woven fabric. A weight of the porous support material is not especially limited, and is preferable in a range of 40 to 170 g/m$^2$ depending on a material.

Examples of resins usable in the porous resin film according to the present invention include water-soluble resins such as polyvinyl alcohol having various molecular weights and saponification values, derivatives of polyvinyl alcohol, cellulose derivatives such as methoxy cellulose, carboxymethylcellulose, and ethyl cellulose, polyacrylic soda, polyvinyl pyrrolidone, acrylic amide-acrylic ester copolymer, acrylic amide-acrylic ester-methacrylic ester copolymer, alkali salt of styrene-maleic anhydride copolymer, polyacrylamide and derivative thereof, and polyethylene glycol. The examples also include water-dispersed resins such as polyolefin such as polyethylene, polyvinyl acetate, polyurethane, urethane-acryl copolymer, styrene-butadiene copolymer (SBR latex), acrylic nitrile-butadiene copolymer (NBR latex), methylmethacrylate-butadiene copolymer (MBR latex), polyacrylic ester, polymethacrylic ester, polyacrylic ester-styrene copolymer, polyvinyl acetate, polyvinyl chloride-vinyl acetate copolymer, ethylene-vinyl acetate copolymer, styrene-butadiene-acryl-based copolymer, and polyvinylidene chloride. However, the resins are not limited to these. These resins may be used alone or as a mixture of two or more thereof, if necessary. Furthermore, various auxiliary agents for general use in the source sheet for the stencil printing may appropriately be added.

The porous resin film according to the present invention is preferably substantially formed of a thermoplastic resin, so that heat fusion by a thermal head is possible. That is, for the porous resin film, the thermoplastic resin preferably contains other resins to such an extent that heat fusion properties or ink passing properties are not inhibited. The thermoplastic resins are not especially limited as long as the pores of the porous resin film can be blocked off by heat. Particularly, vinyl chloride-vinyl acetate copolymer, polyurethane, and the like are preferable.

Additionally, when a softening point (softening temperature) of the thermoplastic resin is too high, and for example, when the thermal head is used in manufacturing the plate by heat fusion, a charging energy into the thermal head needs to be enlarged in order to raise a heating temperature of the thermal head. This sometimes causes a problem in durability of the thermal head. The softening point may appropriately be adjusted in accordance with desired capabilities, so that the heat fusion is practically possible.

In the present invention, in order to appropriately control the passing amount of the low-viscosity ink having a high permeation rate into a printing sheet, air permeability of the porous support material and porous resin film is in the following ranges:

the porous support material has a maximum air permeability of 90 s/100 cc; and, the porous resin film has a maximum air permeability of 600 s/100 cc.

Additionally, the respective air permeabilities (the air permeability degrees) are measured by Gurley densometer (in conformity with JIS P 8117).

When the air permeability of the porous support material is larger than 90 s/100 cc, the ink does not easily pass through the porous support material. Therefore, when a continuous printing is performed, ink supply into the porous resin film contacting the printing sheet becomes insufficient, and there are disadvantages such as deterioration of solid uniformity or fine character reproducibility. On the other hand, a lower limit of the air permeability of the porous support material is preferably 1 s/100 cc or more in order to prevent excessive ink transfer.

Moreover, when the air permeability of the porous resin film is larger than 600 s/100 cc, the ink does not easily pass through the porous resin film. Therefore, when the continuous printing is performed, there are disadvantages such as the deterioration of solid uniformity or fine character reproducibility. The lower limit of the air permeability of the porous resin film is preferably 1 s/100 cc or more in order to prevent the excessive ink transfer.

Furthermore, when the air permeability of the porous resin film is smaller than the air permeability of the porous support material, an ink supply amount into the porous resin film becomes insufficient, the ink transfer amount into the printing sheet also decreases, and there is a tendency of generation of thin spots or white spots in the printed matter. Therefore, the air permeability of the porous resin film is more preferably set to be not less than the air permeability of the porous support material.

That is, the respective air permeability preferably satisfies the following relation:

the air permeability of the porous support material≦the air permeability of the porous resin film.

When the structure of a section of the porous resin film is observed with a scanning electronic microscope, pores of the porous resin film form connection pores which connect one surface of the porous resin film to the other surface. By this structure, since the ink permeates/passes, the porous resin film can be used in the source sheet for the stencil printing according to the present invention.

In the present invention, the porous resin film can be obtained by: coating one surface of the porous support material with a mixed solution containing the above-described resin as a major component (hereinafter referred to the resin mixed solution); and drying the material containing a large number of fine bubbles formed in the resin mixed solution.

A method or apparatus for forming/including the bubbles, and coating method are not especially limited. Examples of a method of forming the porous resin film on the porous support material include the following methods:

(1) a method of coating the porous support material with the resin mixed solution containing foam, and generating gas during or after the coating to form the pores; (2) a method of coating the porous support material beforehand at least one of two or more components which are brought in contact with each other to generate the gas, coating the coated surface with the resin mixed solution containing other components, and forming a foamed film; (3) a method of coating the porous support material with the resin mixed solution in which the gas has been dissolved under atmosphere higher than 1 atm. under normal pressures, foaming the material and forming the pores; and (4) a method of coating the porous support material with a bubble containing resin mixed solution obtained by mechanically agitating the resin mixed solution and forming and dispersing a large number of bubbles in the solution, and drying the material.

Any one of the methods (1) to (4) may be used, and the method (4) is most preferable in the present invention. Additionally, a known pigment, viscosity adjuster, dispersant, dye, water resistance agent, lubricant, crosslinking agent, plasticizer, and the like can be added into the resin mixed solution, if necessary.

A coating amount of the porous resin film on the porous support material is preferably in a range of 5 to 40 g/m$^2$, more preferably in 10 to 30 g/m$^2$ in terms of dry weight on one surface of the porous support material.

When the coating amount is smaller than 5 g/m$^2$, it is difficult to sufficiently coat surface roughness of the porous support material, and it tends to be impossible to obtain the source sheet for the stencil printing with the surface thereof having an appropriate smoothness. When the coating amount exceeds 40 g/m$^2$, the porous resin film becomes excessively thick, having a tendency toward poor ink passing properties. Furthermore, a coupling strength in the porous resin film drops, flaw or coated layer peel is easily generated in usual handling, and it tends to be impossible to obtain sufficient strength. Therefore, the coating amount of the porous resin film may appropriately be set in accordance with these requirements.

Moreover, density of the porous resin film (hereinafter referred to as coated layer density) is preferably in a range of 0.1 to 0.8 g/cm$^3$, more preferably 0.2 to 0.6 g/cm$^3$. When the coated layer density is lower than 0.1 g/cm$^3$, surface strength of the porous resin film sometimes becomes insufficient. When the density is higher than 0.8 g/cm$^3$, the ink sometimes insufficiently permeates/passes because of lack of void inside the porous resin film.

It is to be noted that the coated layer density can be calculated by the following equation:

$$\text{Coated layer density } (g/\text{cm}^3)=(A/B)$$

wherein

A (g/m$^2$)=weight of the source sheet for the stencil printing (g/m$^2$)−weight of the porous support material (g/m$^2$), and B ($\mu$m)=thickness of the source sheet for the stencil printing ($\mu$m)−thickness of the porous support material ($\mu$m).

Moreover, a bubble containing state of the bubble containing resin mixed solution is not especially limited, but the solution preferably has a volume ratio to a material solution of the bubble containing solution (hereinafter referred to as a foaming magnification) in a range of 1 to 10 times, more preferably 1 to 5 times.

Here, the foaming magnification is a measure indicating a bubble containing ratio in the bubble containing resin mixed solution, and indicates that the thickness of the resin film (wall) constituting the bubble decreases with an increase of the foaming magnification.

Moreover, with the same foaming magnification, when concentration of a solid form of the resin mixed solution before the foaming decreases, the resin film becomes thin.

When the resin film is thinned in this manner, it is sometimes difficult to maintain a sufficient level of strength of the obtained porous resin film. Therefore, the foaming magnification may appropriately be set in accordance with the requirements.

In the present invention, an average pore diameter of the porous resin film is preferably 20 $\mu$m or less, more preferably 10 $\mu$m or less.

With the average pore diameter exceeding 20 $\mu$m, during the plate manufacturing for example by the heat fusion, a portion in which the pores are too large to be blocked starts to be formed, and the ink is passed through the portion and transferred onto the printing sheet. This undesirably causes a problem that the ink is transferred in a pinhole shape to a portion which is to be blank in the printed matter. On the other hand, during the manufacturing, it is generally difficult to obtain an average pore diameter of less than 1 $\mu$m, and the diameter of 1 $\mu$m or more is preferable.

Additionally, for the pore diameter, some of the pores are photographed by the scanning electronic microscope, and measured by an image analysis apparatus so that the average value (average pore diameter) can be obtained.

The size of the pore is influenced by various factors such as composition of the resin mixed solution before the bubble forming/dispersing treatment, that is, types and blend ratio of materials, foaming conditions including the foaming magnification, and coating method and condition, but an appropriate condition may be set in accordance with the requirements.

Additionally, for the size of the pore in the surface of the porous resin film, when the size of bubble in the bubble containing resin mixed solution obtained by the mechanical agitation decreases, the pores in the surface of the porous resin film after the coating and drying also become small.

In the present invention, the foaming method of forming and dispersing the bubbles in the resin mixed solution is not especially limited. For example, there can be used: a foaming machine for so-called confectionery production, with an agitation wing to rotate with planetary movement; a homogeneous mixer generally for use in emulsification/dispersion; an agitator such as Cowless dissolver; and a continuous foaming machine such as an apparatus in which a mixture of air and resin mixed solution is mechanically agitated and continuously fed into a hermetically sealed system and air can be dispersed and mixed into fine bubbles (e.g., the apparatus manufactured U.S. Gaston County Co., or Stork Co. in Holland).

Moreover, into the resin mixed solution, it is possible to approximately select and blend a material from a broad range of surfactants referred to as a foam stabilizer and foaming agent for a purpose of compensating capabilities of mechanical agitating facilities and obtaining a higher bubble containing state, or enhancing stability of bubbles in the bubble containing resin mixed solution.

The surfactants such as higher fatty acid, higher fatty acid modifier, and alkali salt of higher fatty acid can be used, especially because of an effect of enhancing foaming properties of the resin mixed solution, or an effect of enhancing stability of the dispersed or contained bubbles.

The selection is not especially limited, and the surfactant may appropriately be selected in consideration of fluidity and coating operation properties of the resin mixed solution.

Moreover, a use amount of the surfactant such as the foam stabilizer and foaming agent is, for example, preferably 0 to 30 parts by weight of, more preferably 1 to 20 parts by weight of a surfactant solid foam with respect to 100 parts by weight of the solid form of a water-dispersed resin mixed solution. Even when a large amount exceeding 30 parts by weight of the surfactant is added, the effect is saturated, and this is economically inefficient in many cases.

A coating method for forming the porous resin film on the porous support material can optionally be selected from known methods such as Mayer bar method, gravure roll method, roll method, reverse roll method, blade method, knife method, air knife method, extrusion method, and cast method.

The porous resin film in the present invention can be obtained by uniformly coating one surface of the porous support material by the above-described coating method, and subsequently drying the surface. Although the surface smoothness is high in this stage, the porous resin film may be subjected to a smooth finish treatment in order to raise the surface smoothness. Examples of an apparatus of the smooth finish treatment include: a machine calender including two or more stages of metal rolls; and a super calender constituted by an appropriate combination of metal and resin rolls, or metal and cotton rolls.

Additionally, with the smooth finish treatment under an excess pressure, the porous resin film is densified, the pores in the surface are deformed or ruptured, and therefore the ink cannot sometimes permeate/pass. Therefore, a treatment condition of the smooth finish treatment may appropriately be selected by the requirements.

According to the present invention, the thickness of the source sheet for the stencil printing including the porous resin film formed on the porous support material is in a range of preferably 5 to 200 $\mu$m, more preferably 15 to 150 $\mu$m, further preferably 30 to 100 $\mu$m.

When the thickness of the source sheet for the stencil printing exceeds 200 $\mu$m, the ink passing property is deteriorated and it tends to be impossible to obtain sufficient solid uniformity. Moreover, the source sheet for the stencil printing becomes excessively elastic, and contact and operation properties with heating means such as the thermal head in manufacturing the plate tend to be deteriorated. On the other hand, when the thickness of the source sheet for the stencil printing is less than 5 $\mu$m, strength required of the source sheet for the stencil printing for example in conveying cannot be secured, the source sheet for the stencil printing tend to be wrinkled or broken, and therefore this size lacks in practicality.

The porous resin film of the source sheet for the stencil printing according to the present invention preferably contains an antistatic agent in order to prevent a conveying defect by static electricity. For the antistatic agent, as long as the passing of the ink is not inhibited, various known antistatic agents can preferably be used alone or as a mixture of two or more thereof.

The antistatic agent may be blended with the resin mixed solution for the porous resin film so that the agent is contained in the porous resin film. Alternatively, after the porous resin film is formed onto the porous support material, the porous resin film surface may be coated with the agent. A coating method is not especially limited. For example, the agent may be diluted with solvents such as water and alcohol, applied using a spray, immersion, brush, roll coater, and the like, and dried. The content or coating amount of the antistatic agent is not especially limited, and can optionally be set to such an extent that the addition purposes are sufficiently achieved and the ink passing property is not hampered.

In the source sheet for the stencil printing according to the present invention, a total content of materials which corrode/damage a heating element of the thermal head, such as halogen ion and alkaline metal ion is preferably not more than 700 ppm.

Further in the source sheet for the stencil printing according to the present invention, a release layer containing a mold release agent is preferably formed on the surface of the porous resin film so that the molten porous resin does not adhere to the thermal head and the like.

Examples of the mold release agent include: the mold release agent containing one or two or more of a silicone base, fluorine base, wax base, and activator; silicone phosphoric ester; and the like. A method of forming the release layer on the surface of the porous resin film is not especially limited, and examples of the method include a method of coating the surface with the mold release agent. Concretely, the method may comprise: dispersing or dissolving the components including the mold release agent in an optional solvent; applying the solvent using a roll coater, gravure coater, reverse coater, bar coater, and the like; and evaporating the solvent.

The coating amount of the formed release layer is preferably of the order of 0.001 to 0.5 g/m$^2$ such that the ink passing property is not hampered and sufficient release property is obtained.

The release layer containing the above-described mold release agent may appropriately contain the above-described antistatic agent, binder resin, hot-melt material, and the like to such an extent that the object of the present invention is not impaired.

According to a plate manufacturing method of the source sheet for stencil printing of the present invention, the pores of the porous resin film of the source sheet for the stencil printing according to the present invention are blocked off so that a portion prohibiting passage of ink (a blocked portion) is formed corresponding to a non-image area of a desired printed image.

A method of blocking the pores is not especially limited, and examples of the method include: a method by heat fusion; a method of transferring a resin or wax; a method of coating or impregnating with a photo-setting solution, and curing the solution to block the pores; and the like. The method by the heat fusion is most preferable in the present invention.

Furthermore, in the method of the heat fusion, heating means such as the thermal head, and electromagnetic wave (such as laser beam) irradiation is preferably used.

Additionally, the thermal head may be either a line type thermal head or a serial type thermal head. A resistor of the thermal head may be either a thin-film thermal head formed mainly by sputtering, or a thick-film thermal head formed in a thick-film printing method.

FIG. 1 schematically shows one example of the plate manufacturing method according to the present invention, in which the source sheet for the stencil printing of the present invention is formed into a plate by the heat fusion by the thermal head.

A source sheet for stencil painting 1 is fed to an image forming portion including a thermal head 2 and platen roller 3 by an optional feed roller (not shown). Here, the source sheet for the stencil printing 1 includes a release layer 6 so that the sheet does not adhere to the thermal head 2.

Subsequently, when a heating element 4 of the thermal head 2 generates heat in response to an image signal, the surface (plate forming surface) of the source sheet for stencil printing 1 melts, and a blocked portion (non-image area) 5 is formed, where pores of the porous resin film of the source sheet for the stencil printing are blocked off.

A stencil surface (porous resin film surface) of the source sheet for the stencil printing formed into a plate (hereinafter referred to as the plate for the stencil printing), which is obtained as described above, is superimposed upon a printing sheet. When the ink is supplied from a non-stencil surface on an opposite side (porous support material side), the ink exudes from the pores (not blocked, and corresponding to the image area) of the stencil surface. The ink is transferred to the printing sheet and the stencil printing is performed.

Additionally, in the plate for the stencil printing, the pores in the non-image area are not especially limited as long as the pores are blocked in at least the stencil surface to prevent exudation of the ink, and do not extend through the plate to the other surface from one surface.

A stencil printing method according to the present invention comprises: using an ink having a viscosity in a range of 0.001 to 1 Pa·s to perform a stencil printing from the plate for the stencil printing. With the use of the ink whose viscosity exceeds 1 Pa·s, a portion through which the ink cannot pass is generated in the porous resin film. This is undesirable, because many white spots are generated in a solid portion, or thin spots are generated in a fine character portion, and characters are illegible of a printed matter.

Moreover, the ink whose viscosity is less than 0.001 Pa·s is undesirable, because it is very difficult to manufacture the ink, and defects such as ink leak are remarkably generated in a printing apparatus.

A coloring agent of the ink may be either a pigment or dye, but there is fear that clogging occurs with the pigment depending on the average pore diameter of the porous resin film. In this case, it is preferable to use the dye.

Other components such as an ink vehicle and additive are not especially limited. Moreover, the ink is not especially limited to an emulsion ink for a known W/O type stencil printing. For example, an aqueous or oily ink for ink jet or stamp may also be used.

Additionally, a method of supplying the ink to the plate may comprise: impregnating a material which can be impregnated with the ink and which has continuous bubbles (e.g., natural rubber, synthetic rubber-based sponge rubber, synthetic resin foam, and the like) with the ink; superimposing the material upon the porous support material surface of the plate; next disposing the stencil surface opposite to the printing sheet; and pressing the plate so that the ink is transferred and the stencil printing can be performed. However, this method is not especially limited.

A concrete printing method is not especially limited. The method may comprise: winding the plate around a printing drum of a known rotary stencil printing apparatus, and supplying the ink from the inside of the printing drum so that a continuous printing is performed; or using a simple stencil printing apparatus for household use to perform a press printing.

EXAMPLES

The present invention will be described hereinafter in more detail by way of examples, but the present invention is not limited to these examples without departing from technical thoughts of the present invention. For example, the resolution and type of the thermal head may also be other than the resolution and type described herein. The type and prescription of the materials such as the mold release agent may further be other than the type and prescription described herein.

Additionally, measurement and evaluation described in the examples were performed in the following methods.

(1) Plate Manufacturing Method

First, for each of source sheets for the stencil printing (hereinafter referred to as the source sheet) prepared in each example and comparative example, a contact surface with the thermal head, that is, the porous resin film surface was coated with a mold release agent solution containing 5 parts by weight of polyether modified silicone oil (TSF400, product name of GE Toshiba Silicone Co., Ltd.) and 95 parts by weight of methanol with a wire bar, and a release layer with the dry weight of 0.1 g/m$^2$ was formed.

Subsequently, for each source sheet with the release layer attached thereto, was treated with the thermal head to obtain the plate, in a method of blocking the pores of a heated portion of the porous resin film to form a non-printing portion from a printing draft in a plate manufacturing apparatus.

Additionally, the optional thermal head is attachable to the plate manufacturing apparatus. In the plate manufacturing apparatus, a thermal head driving condition, plate manufacturing pressure condition, and the like can optionally be set. The plate manufacturing apparatus was used to manufacture the plate with the thermal head for a heat transfer printing, having a resolution of 300 dpi. Moreover, the printing draft was a draft in which 6–16 points character portion and solid portion existed in a mixed manner and which had a printing ratio of 25%.

(2) Evaluation of Pore Block-Off

For the plate obtained in the above (1), the block-off degree of the pore was observed in scanning electronic microscope (SEM) and evaluated on the following standard:

○: The pores are completely blocked off, and the result indicates a usable level.

Δ: There are a small number of unblocked pores, but the result indicates a practically usable level.

×: There are many portions in which the pores are not blocked, the ink is transferred in the form of pinholes onto the printing sheet through a non-printing portion to which any heat is not applied, and therefore the results indicates an unusable level.

(3) Thermal Deformation (Dimensional Change) of Source Sheet by Plate Manufacturing A dimensional change ratio (%) of each source sheet before and after the plate making by the above (1) was obtained by the following formula:

[(Dimension before plate manufacturing)−(dimension after the plate manufacturing)]×100/(dimension before the plate manufacturing) (%)

It was judged whether or not it was possible to use the plate in accordance with the following standard concerning the dimensional change.

○: The dimensional change ratio is less than 0.2% and the result indicates the usable level.

Δ: The dimensional change ratio is in a range of 0.2 to less than 0.6%, and the result indicates the practically usable level.

×: The dimensional change ratio is not less than 0.6%, and the results shows the unusable level.

(4) Printing Method

Each plate manufactured by the above (1) was attached to a master frame for the stencil printing apparatus (Print Gokko PG-11, merchandise name manufactured by Riso Kagaku Corp.), and set into the apparatus. Subsequently, continuous bubble sponge ("Ruby Cell", product name by Toyo Polymer Co., Ltd.) was impregnated with an aqueous dye ink with a surface tension of $3.2\times10^{-2}$ N/m, viscosity of $3.2\times10^{-3}$ Pa·s (ink for IJ printer by Seiko Epson Corporation: model No. IC1-BK05) or a trial aqueous dye ink having different viscosity as described later, and was used as an ink impregnated material, so that the stencil printing was performed.

(5) Evaluation of Solid Uniformity, Fine Character Reproducibility, and Ink Drying Property For the solid uniformity, fine character reproducibility and ink drying property of the printed matter obtained by the above printing method (4), usable/unusable was judged in accordance with the following standard.

(Solid Uniformity: Visual Evaluation of Solid Portion of Printed Matter)

○: The ink passing property is satisfactory, the solid portion uniformly appears, and the result shows the usable result.

Δ: There are density unevenness and white spots by ink non-passing portion in the solid portion, but the result indicates the practically usable level.

×: The ink passing property is unsatisfactory, the density unevenness and white spots remarkably appear in the solid portion, and the result indicates the unusable result.

(Fine Character Reproducibility: Visual Evaluation of Character Portion of Printed Matter)

○: There is no blur in an ink transferred image of characters, the image is sharp, and the results indicates the usable level.

Δ: There are slight blur or thin spots, but the result indicates the practically usable level.

×: There are remarkable blur or thin spots, characters are illegible and the result indicates the unusable level.

(Ink Drying Property: Touch Solid Portion of Printed Matter, and Visually Evaluate Rub Degree)

○: No rub is generated, the printed matter is not stained, and the result indicates the usable level.

Δ: Slight rub is generated, the printed matter is also slightly stained, but the result indicates the usable level without any practical problem.

×: The rub is generated, the stain of the printed matter is conspicuous, and the result indicates the unusable level.

(6) Air Permeability Degree

B type Gurley densometer manufactured by Toyo Seiki Co. was used in conformity with JIS P 8117 and a time required for gauge lines 0 to 100 was measured by a stop watch.

Additionally, the air permeability of the porous resin film was calculated by subtracting the air permeability of the porous support material used in preparing the source sheet from the air permeability of each prepared source sheet.

Air permeability of porous resin film=air permeability of source sheet for stencil printing−air permeability of porous support material (7) Average Pore Diameter The surface of the porous resin film of each source sheet was photographed by a scanning electronic microscope, and pore diameters were measured with respect to the pores in the surface. The diameters of 100 pores per source sheet were measured and averaged to obtain the value of the average pore diameter of the porous resin film.

Example 1

| (Resin Mixed Solution Prescription) | |
|---|---|
| Resin: aqueous polyurethane resin (Adeca Bon Titer-HUX-401, product name of Asahi Denka Co., Ltd.) | 100 parts by weight |
| Foam stabilizer: higher fatty acid-based agent (SN Foam 200, product name of Sun Nopco Limited) | 5 parts by weight |
| Thickening agent: carboxymethylcellulose (AG GUM, product name of Dai-ichi Kogyo Seiyaku Co., Ltd.) | 2 parts by weight |

The resin mixed solution was subjected to a foaming treatment at an agitation rate of 500 rpm for 25 minutes using an agitator (Ken Mix Aicoh PRO, product name of Aicoh Manufacturing Co., Ltd.), and a bubble containing resin mixed solution having a foaming magnification of 7.0 times was prepared. Immediately after preparation, one surface of quality paper having a weight of 52 g/m² was coated with the solution in a coating amount of 15 g/m² using an applicator bar and dried, the porous resin film was formed and a heat-sensitive source sheet for the stencil printing was obtained.

An average pore diameter of the porous resin film of the obtained source sheet is 1.0 μm, coated layer density is 0.14 g/cm³, and physical properties are shown in Table 1.

TABLE 1

| | | Example | | | | | | | | |
|---|---|---|---|---|---|---|---|---|---|---|
| | | 1 | 2 | 3 | 4 | 5 | 6 | 7 | 8 | 9 |
| Resin | | Aqueous polyurethane | ← | ← | ← | ← | Vinyl chloride-vinyl acetate | Aqueous polyurethane | ← | ← |
| Weight of porous support material | (g/m$^2$) | 52 | ← | ← | ← | 157 | 52 | ← | ← | 157 |
| Average pore diameter of porous resin film | ($\mu$m) | 1.0 | 5.2 | 10.5 | 20.8 | 1.0 | 11.0 | 20.8 | 15.0 | 20.0 |
| Coated layer density | (g/m3) | 0.14 | 0.39 | 0.39 | 0.65 | 0.14 | 0.14 | 0.65 | 0.50 | 0.60 |
| Air permeability of porous support material | (sec/100cc) | 15 | 15 | 15 | 15 | 90 | 15 | 15 | 30 | 90 |
| Air permeability of porous resin film | (sec/100cc) | 600 | 300 | 150 | 20 | 600 | 140 | 20 | 90 | 30 |
| Ink | | Aqueous dye ink | ← | ← | ← | ← | ← | ← | ← | ← |
| Ink viscosity | Pa · s | 0.0032 | ← | ← | ← | ← | ← | 1.0 | 0.0032 | ← |
| Pore block property | | ○ | ○ | ○ | Δ (*1) | ○ | ○ | Δ (*1) | ○ | ○ |
| Thermal deformation of source sheet | | ○ | ○ | ○ | ○ | ○ | ○ | ○ | ○ | ○ |
| Solid uniformity | | Δ (*2) | ○ | ○ | ○ | Δ (*2) | ○ | Δ (*2) | ○ | Δ (*2) |
| Fine character reproducibility | | Δ (*3) | ○ | ○ | Δ (*4) | Δ (*3) | ○ | Δ (*3) | ○ | Δ (*3) |
| Ink drying property | | ○ | ○ | ○ | Δ (*5) | ○ | ○ | ○ | ○ | ○ |

(*1) Slightly unblocked
(*2) Slight white spot
(*3) Slight thin spot
(*4) Slight blur
(*5) Slight rub As described above in (1), after the release layer was formed on the obtained source sheet, the plate manufacturing was performed by the thermal head, and an aqueous dye ink (ink for IJ printer by Seiko Epson Corporation: model No. IC1-BK05) having a viscosity of 0.0032 Pa·s was used to perform the printing.

As a result, as shown in Table 1, the pore block property, thermal deformation of the source sheet by the plate manufacturing, and ink drying property obtained very satisfactory results, and the solid uniformity and fine character reproducibility obtained results indicating practically usable levels.

Example 2

The resin mixed solution having the same composition as that of Example 1 was subjected to the foaming treatment at an agitation rate of 500 rpm for one minute using the same agitator, and the bubble containing resin mixed solution having a foaming magnification of 1.1 times was prepared. Immediately after the preparation, the surface of quality paper having a weight of 52 g/m$^2$ was coated with the solution in a coating amount of 15 g/m$^2$ using the applicator bar and dried, the porous resin film was formed and the heat-sensitive source sheet for the stencil printing was obtained.

The average pore diameter of the porous resin film of the obtained source sheet is 5.2 $\mu$m, coated layer density is 0.39 g/cm$^3$, and physical properties are shown in Table 1.

Similarly as Example 1, after the release layer was formed on the obtained source sheet, the plate manufacturing was performed by the thermal head, and the printing was performed.

As a result, as shown in Table 1, all the pore block property, thermal deformation of the source sheet by the plate manufacturing, solid uniformity, fine character reproducibility and ink drying property obtained very satisfactory results.

Example 3

The resin mixed solution having the same composition as that of Example 1 was subjected to the foaming treatment at an agitation rate of 500 rpm for one minute using the same agitator, and the bubble containing resin mixed solution having a foaming magnification of 2.5 times was prepared. Immediately after the preparation, the surface of quality paper having a weight of 52 g/m$^2$ was coated with the solution in a coating amount of 15 g/m$^2$ using the applicator bar and dried, the porous resin film was formed and the heat-sensitive source sheet for the stencil printing was obtained.

The average pore diameter of the porous resin film of the obtained source sheet is 10.5 $\mu$m, coated layer density is 0.39 g/cm$^3$, and physical properties are shown in Table 1.

Similarly as Example 1, after the release layer was formed on the obtained source sheet, the plate manufacturing was performed by the thermal head, and the printing was performed.

As a result, as shown in Table 1, all the pore block property, thermal deformation of the source sheet by the plate manufacturing, solid uniformity, fine character reproducibility, and ink drying property obtained very satisfactory results.

Example 4

The resin mixed solution having the same composition as that of Example 1 was subjected to the foaming treatment at an agitation rate of 500 rpm for 30 seconds using the same agitator, and the bubble containing resin mixed solution having a foaming magnification of 1.2 times was prepared. Immediately after the preparation, the surface of quality paper having a weight of 52 g/m$^2$ was coated with the solution in a coating amount of 15 g/m$^2$ using the applicator bar and dried, the porous resin film was formed and the heat-sensitive source sheet for the stencil printing was obtained.

The average pore diameter of the porous resin film of the obtained source sheet is 20.8 μm, coated layer density is 0.65 g/cm$^3$, and physical properties are shown in Table 1.

Similarly as Example 1, after the release layer was formed on the obtained source sheet, the plate manufacturing was performed by the thermal head, and the printing was performed.

As a result, as shown in Table 1, the thermal deformation of the source sheet by the plate manufacturing, and solid uniformity obtained very satisfactory results, and the pore block property, fine character reproducibility, and ink drying property obtained the results indicating the practically usable levels.

Example 5

The source sheet for the stencil printing was obtained on the same conditions as those of Example 1, except that the surface of quality paper having a weight of 157 g/m$^2$ was coated with the bubble containing resin mixed solution in Example 1.

The average pore diameter of the porous resin film of the obtained source sheet is 1.0 μm, coated layer density is 0.14 g/cm$^3$, and physical properties are shown in Table 1.

Similarly as Example 1, after the release layer was formed on the obtained source sheet, the plate manufacturing was performed by the thermal head, and the printing was performed.

As a result, as shown in Table 1, the pore block property, thermal deformation of the source sheet by the plate manufacturing, and ink drying property obtained very satisfactory results, and the solid uniformity and fine character reproducibility obtained the results indicating the practically usable levels.

Example 6

| (Resin Mixed Solution Prescription) | |
|---|---|
| Resin: vinyl chloride-vinyl acetate resin (Vinyblan 240, product name of Nisshin Chemical Industry Co., Ltd.) | 100 parts by weight |
| Foam stabilizer: higher fatty acid-based agent (SN Foam 200, product name of Sun Nopco Limited) | 5 parts by weight |
| Thickening agent: carboxymethylcellulose (AG GUM, product name of Dai-ichi Kogyo Seiyaku Co., Ltd.) | 2 parts by weight |

The resin mixed solution was subjected to the foaming treatment at an agitation rate of 500 rpm for one minute using the agitator (Ken Mix Aicoh PRO, product name of Aicoh Manufacturing Co., Ltd.), and the bubble containing mixed solution having a foaming magnification of 2.5 times was prepared. Immediately after the preparation, the surface of quality paper having a weight of 52 g/m$^2$ was coated with the solution in a coating amount of 15 g/m$^2$ using the applicator bar and dried, the porous resin film was formed and the heat-sensitive source sheet for the stencil printing was obtained.

The average pore diameter of the porous resin film of the obtained source sheet is 11.0 μm, coated layer density is 0.14 g/cm$^3$, and physical properties are shown in Table 1.

Similarly as Example 1, after the release layer was formed on the obtained source sheet, the plate manufacturing was performed by the thermal head, and the printing was performed.

As a result, as shown in Table 1, all the pore block property, thermal deformation of the source sheet by the plate manufacturing, solid uniformity, fine character reproducibility, and ink drying property obtained very satisfactory results.

Example 7

Similarly as Example 4, the plate manufacturing and printing were performed with the source sheet used in Example 4, except that the viscosity of the ink used during the printing was set to 1.0 Pa·s.

As a result, as shown in Table 1, the pore block property, thermal deformation of the source sheet by the plate manufacturing, and ink drying property obtained very satisfactory results, and the solid uniformity and fine character reproducibility obtained results indicating the practically usable levels.

Example 8

The resin mixed solution having the same composition as that of Example 1 was subjected to the foaming treatment at an agitation rate of 500 rpm for 30 seconds using the same agitator. Immediately after the bubble containing resin mixed solution having a foaming magnification of 2.0 times was prepared, the surface of quality paper having a weight of 52 g/m$^2$ was coated with the solution in a coating amount of 15 g/m$^2$ using the applicator bar and dried, the porous resin film was formed and the heat-sensitive source sheet for the stencil printing was obtained.

The average pore diameter of the porous resin film of the obtained source sheet is 15.0 μm, coated layer density is 0.50 g/cm$^3$, and physical properties are shown in Table 1.

Similarly as Example 1, after the release layer was formed on the obtained source sheet, the plate manufacturing was performed by the thermal head, and the printing was performed.

As a result, as shown in Table 1, all the pore block property, thermal deformation of the source sheet by the plate manufacturing, solid uniformity, fine character reproducibility, and ink drying property obtained very satisfactory results.

Example 9

The resin mixed solution having the same composition as that of Example 1 was subjected to the foaming treatment at an agitation rate of 500 rpm for 30 seconds using the same agitator. Immediately after the bubble containing resin mixed solution having a foaming magnification of 1.4 times was prepared, the surface of quality paper having a weight of 157 g/m$^2$ was coated with the solution in a coating amount of 15 g/m$^2$ using the applicator bar and dried, the porous resin film was formed and the heat-sensitive source sheet for the stencil printing was obtained.

The average pore diameter of the porous resin film of the obtained source sheet is 20.0 μm, coated layer density is 0.60 g/cm$^3$ and physical properties are shown in Table 1.

Similarly as Example 1, after the release layer was formed on the obtained source sheet, the plate manufacturing was performed by the thermal head, and the printing was performed.

As a result, as shown in Table 1, the pore block property, thermal deformation of the source sheet by the plate manufacturing, and ink drying property obtained very satisfactory results, and the solid uniformity and fine character reproducibility obtained results showing the practically usable results.

Comparative Example 1

The heat-sensitive source sheet for the stencil printing was obtained on the same conditions as those of Example 4, except that the surface of quality paper having a weight of 209 g/m$^2$ was coated with the bubble containing resin mixed solution in Example 4.

Similarly as Example 1, after the release layer was formed on the obtained source sheet, the plate manufacturing was performed by the thermal head, and the printing was further performed.

As a result, as shown in Table 2, the thermal deformation of the source sheet by the plate manufacturing, and ink drying property obtained very satisfactory results. For the pore block property, there was a slightly unblocked portion, a few pinholes were generated in a blank portion, but the result indicated the practically usable level. However, for the solid uniformity and fine character reproducibility, there were many white spots, characters having thin spots were not illegible, and results indicating unusable levels were obtained.

TABLE 2

| | | comparative example | | | |
|---|---|---|---|---|---|
| | Unit | 1 | 2 | 3 | 4 |
| Average pore diameter of porous resin film | (μm) | 20.8 | 20.8 | 1.0 | 29.0 |
| Weight of porous support material | (g/m$^2$) | 209 | 52 | | 11 |
| Air permeability of porous support material | (sec/100cc) | 100 | 15 | None | |
| Air permeability of porous resin film | (sec/100cc) | 20 | 20 | 10 | |
| Pore block property | | Δ (*1) | Δ (*1) | ○ | Δ (*6) |
| Thermal deformation of source sheet | | ○ | ○ | x (*7) | ○ |
| Ink viscosity | (Pa · s) | 0.0032 | 1.2 | 0.0032 | 2.0 |
| Solid uniformity | | x (*8) | x (*8) | ○ | Δ (*2) |
| Fine character reproducibility | | x (*9) | x (*9) | x (*10) | Δ (*3) |
| Ink drying property | | ○ | ○ | x (*11) | x (*11) |

(*1) Slightly unblocked
(*2) Slight white spot
(*3) Slight thin spot
(*6) Slight perforation defect
(*7) Large thermal deformation
(*8) Many white spots
(*9) Thin spots
(*10) Exudation
(*11) Rub Comparative Example 2

The plate manufacturing and printing were performed similarly as Example 4 with the source sheet used in Example 4, except that the viscosity of the ink used during the printing was set to 1.2 Pa·s.

As a result, as shown in Table 2, the thermal deformation of the source sheet by the plate manufacturing, and ink drying property obtained very satisfactory results. For the pore block property, there was a slightly unblocked portion, a few pinholes were generated in the blank portion, but the result indicated the practically usable level. However, for the solid uniformity and fine character reproducibility, there were many white spots, the characters having thin spots were not illegible, and the results indicating unusable levels were obtained.

Comparative Example 3

A micro porous plastic sheet having a film thickness of 80 μm, average pore diameter of 1.0 μm, pore ratio of 70%, and air permeability of 10 s/100 cc, and using polyethylene as a base material was used as the source sheet. After the release layer was formed on the obtained source sheet similarly as Example 1, the plate manufacturing by the thermal head was performed, and further the printing was performed.

As a result, as shown in Table 2, the pore block property and solid uniformity obtained very satisfactory results. However, the source sheet was very largely thermally deformed by the plate manufacturing. For the ink drying property and fine character reproducibility, the printed matter was dirty by rub, and the character portion was remarkably blurred and was not illegible. Therefore, the results indicating unusable levels were obtained.

Comparative Example 4

A polyester film was formed beforehand so as to obtain a single film thickness of 1.7 μm in extension means. This film was superimposed upon a support material which was obtained by weaving natural fibers and polyester fibers and which had a weight of 11 g/m$^2$, via a polyvinyl acetate resin with a coating amount of 0.8 g/m$^2$. Thereafter, the surface of the film was coated with 0.1 g/m$^2$ of silicone-based mold release agent and the source sheet for the stencil printing was prepared.

The plate was manufactured from the obtained source sheet by the thermal head (additionally, a portion corresponding to the printing portion was perforated). The source sheet having an average pore diameter of 29.0 μm was obtained, and the printing was performed using the ink having a viscosity of 2.0 Pa·s.

As a result, as shown in Table 2, the thermal deformation of the source sheet by the plate manufacturing obtained a very satisfactory result, but there were a few non-perforated portions. The solid uniformity and fine character reproducibility obtained results indicating the practically usable levels, but the ink drying property obtained a result indicating the unusable level.

According to the source sheet for the stencil printing and plate manufacturing method of the present invention, the plate for the stencil printing can be obtained which is superior in the pore block property and in which the thermal deformation of the source sheet during the plate manufacturing is suppressed. Moreover, when the plate for the stencil printing manufactured by the plate manufacturing method of the present invention, and low-viscosity ink are used to perform the stencil printing, it is possible to obtain a printed matter superior in solid uniformity, fine character reproducibility, and ink drying property.

What is claimed is:

1. A source sheet for stencil printing comprising:

a porous support material;

a porous resin film formed on a surface of the porous support material;

the porous resin film comprising a non-image forming section comprised of blocked pores and an image forming section comprised of non-blocked pores corresponding to a desired print image, wherein the pores are blocked by deformation of the pores, which cause the pores to collapse;

wherein, the porous support material has a maximum air permeability of 90 s/100 cc; and, the porous resin film has a maximum air permeability of 600 s/100 cc.

2. The source sheet for stencil printing according to claim 1, wherein the air permeability of the porous support material and porous resin film satisfies the following relation: the air permeability of the porous support material≦the air permeability of the poro resin film.

3. The source sheet for stencil printing according to claim 1, wherein the porous resin film is formed substantially of a thermoplastic resin.

4. The source sheet for stencil printing according to claim 1, wherein a release layer is formed on the surface of the porous resin film of said source sheet.

5. The source sheet for stencil printing according to claim 1, wherein an average pore diameter of the porous resin film is a maximum 20 $\mu$m.

6. The source sheet for stencil printing according to claim 1, wherein the porous resin film contains an antistatic agent.

7. A source sheet for stencil printing comprising: a porous support material; a porous resin film formed on a surface of the porous support material; wherein, the porous support material has a maximum air permeability of 90 s/100 cc and a weight of about 40 g/$m^2$ to 170 g/$m^2$; and, the porous resin film has a maximum air permeability of 600 s/100 cc.

* * * * *

UNITED STATES PATENT AND TRADEMARK OFFICE

CERTIFICATE OF CORRECTION

PATENT NO. : 6,841,233 B2
DATED : January 11, 2005
INVENTOR(S) : Kinoshita et al.

It is certified that error appears in the above-identified patent and that said Letters Patent is hereby corrected as shown below:

<u>Column 19,</u>
Line 8, please delete “poro” and replace -- porous --

Signed and Sealed this

Nineteenth Day of April, 2005

JON W. DUDAS
*Director of the United States Patent and Trademark Office*